Figure 1:
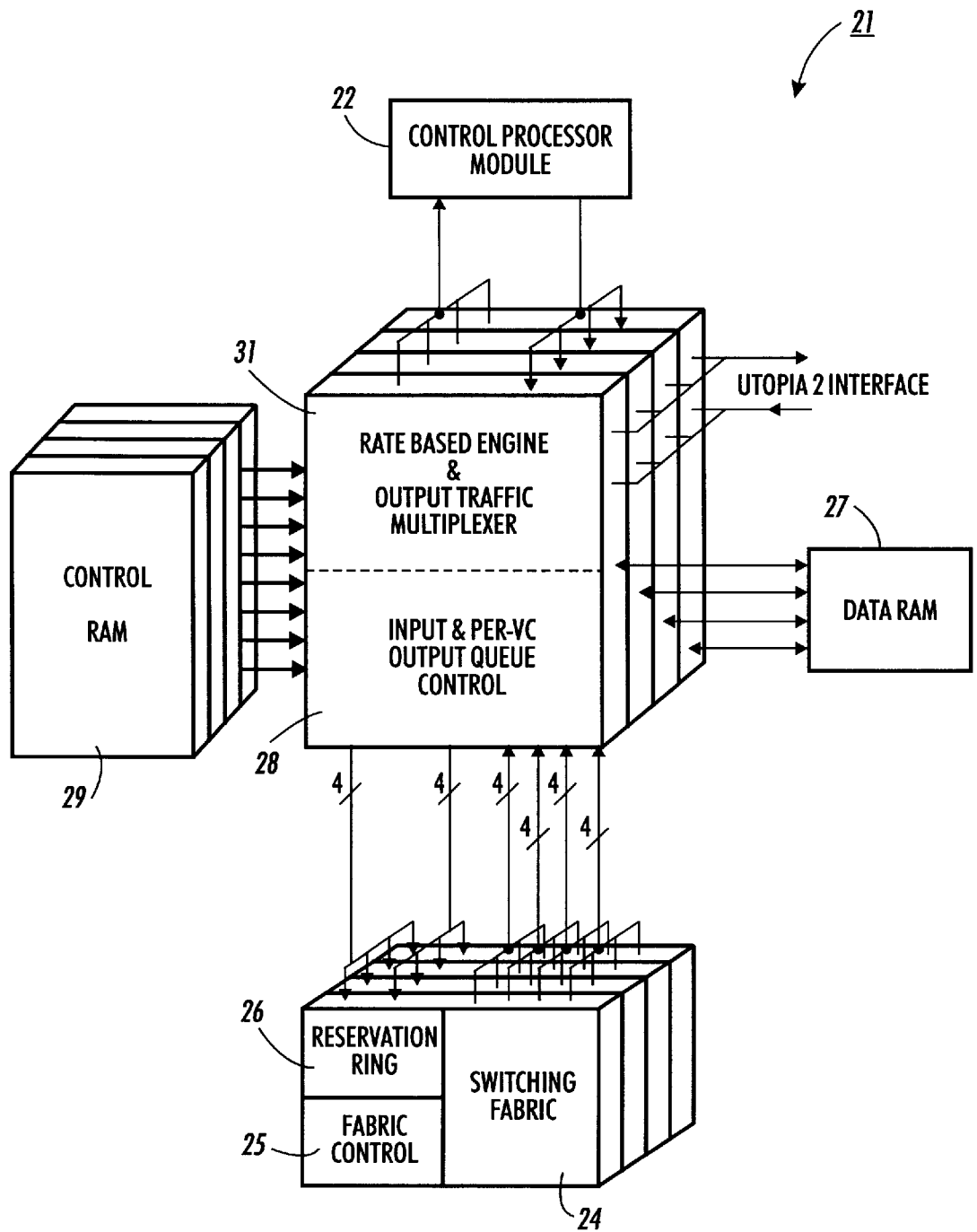

United States Patent

Kappler et al.

[11] Patent Number: 6,064,677
[45] Date of Patent: May 16, 2000

[54] MULTIPLE RATE SENSITIVE PRIORITY QUEUES FOR REDUCING RELATIVE DATA TRANSPORT UNIT DELAY VARIATIONS IN TIME MULTIPLEXED OUTPUTS FROM OUTPUT QUEUED ROUTING MECHANISMS

[75] Inventors: Christopher J. Kappler, Charlestown, Mass.; J. Bryan Lyles, Mountain View, Calif.

[73] Assignee: Xerox Corporation, Stamford, Conn.

[21] Appl. No.: 08/872,327

[22] Filed: Jun. 10, 1997

Related U.S. Application Data

[60] Provisional application No. 60/020,644, Jun. 27, 1996.

[51] Int. Cl.$^7$ .............................. H04L 12/28; H04L 12/56
[52] U.S. Cl. ........................................... 370/414; 370/395
[58] Field of Search .................... 370/230, 235, 370/395, 397, 465, 468, 412, 414, 415, 416–9

[56] References Cited

U.S. PATENT DOCUMENTS

| | | | |
|---|---|---|---|
| 5,231,633 | 7/1993 | Hluchyj et al. | 370/94.1 |
| 5,278,828 | 1/1994 | Chao | 370/85.6 |
| 5,640,389 | 6/1997 | Masaki et al. | 370/418 |
| 5,828,878 | 10/1998 | Bennett | 395/672 |

OTHER PUBLICATIONS

Sriram, Kotikalapudi et al. "An Adaptive Mac–Layer Protocol for Multiservice Digital Access Via Tree and Branch Communication Networks," Proceedings of the SPIE, vol. 2609, Oct. 1995, pp. 10–21.

Zhang, Lixia "VirtualClock: a New Traffic Control Algorithm for Packet–Switched Networks," ACM Transactions on Computer Systems, vol. 9, No. 2, May 1991, pp. 101–124.

Goyal, Pawan and Harrick M. Vin. "Generalized Guaranteed Rate Scheduling Algorithms: A Framework," Technical Report TR–95–30, Department of Computer Sciences, University of Texas at Austin, Sep. 1995, 27 pages.

Goyal, Pawan and Harrick M. Vin. "Generalized Guaranteed Rate Scheduling Algorithms: A Framework," IEEE/ACM Transactions on Networking, vol. 5, No. 4, Aug. 1997, pp. 561–571.

Sackett et al, ATM and Multiprotocol Networking, pp. 193–204, 1996.

*Primary Examiner*—Douglas W. Olms
*Assistant Examiner*—David R Vincent
*Attorney, Agent, or Firm*—Fliesler, Dubb, Meyer & Lovejoy LLP

[57] ABSTRACT

Multiple rate sensitive priority queues reduce relative data transport unit delay variations in time multiplexed from output queued routing mechanisms.

6 Claims, 3 Drawing Sheets

MULTIPLE RATE SENSITIVE PRIORITY QUEUES FOR REDUCING RELATIVE DATA TRANSPORT UNIT DELAY VARIATIONS IN TIME MULTIPLEXED OUTPUTS FROM OUTPUT QUEUED ROUTING MECHANISMS

Pursuant to 35 U.S.C.120, the priority of the inventors' earlier filed provisional application filed on Jun. 27, 1996 under Ser. No. 60/020,644 is claimed.

I. FIELD OF THE INVENTION

This invention relates to packet switched communication networks and, more particularly, to traffic shaping for causing the time multiplexed packet flows at queuing points within such networks or network elements to conform to specified traffic descriptors.

II. CROSS REFERENCES TO RELATED APPLICATIONS

For other concurrent filings on traffic shaping see Attorney Docket No. D/96271Q1P by Landis C. Rogers et al., entitled "Rate Shaping in Per-Flow Output Queued Routing Mechanisms for Statistical Bit Rate Service," Attorney Docket No. D/96271Q2P by Joseph B. Lyles et al., entitled "Rate Shaping in Per-Flow Queued Routing Mechanisms for Available Bit Rate Service," Attorney Docket No. D/96271 Q3P by Joseph B. Lyles, entitled "Rate Shaping in Per-Flow Output Queued Routing Mechanisms for Available Bit Rate (ABR) Service in Networks Having Segmented ABR Control Loops," Attorney Docket No. D/96271Q4P by Joseph B. Lyles et al., entitled "Rate Shaping in Per-Flow Output Queued Routing Mechanisms for Unspecified Bit Rate Service," Attorney Docket No. D/96271Q5P by Christopher J. Kappler et al., entitled "Rate Shaping in Per-Flow Output Queued Routing Mechanisms Having Output Links Servicing Multiple Physical Layers."

III. BACKGROUND OF THE INVENTION

A. Traffic Contracts/Definitions

Most applications that are currently running on packet switched communication networks can function acceptably with whatever bandwidth they happen to obtain from the network because they have "elastic" bandwidth requirements. The service classes that support these applications is known as "best efforts" service in the Internet community and as "Available Bit Rate" (ABR) in the Broadband ISDN/ATM community.

There is, however, a growing demand for network services that provide bounded jitter or, in other words, bounded packet delay variation (commonly referred to as cell delay variation in an ATM context). For example, this type of service is required for real time applications, such as circuit emulation and video. It is not clear whether and how the Internet community will respond to this demand, but the Broadband ISDN/ATM community has responded by introducing the notion of a user-network negotiated traffic contract.

As is known, a user-network ATM contract is defined by a traffic descriptor which includes traffic parameters, tolerances and quality of service requirements. A conformance definition is specified for each of the relevant traffic parameters. Accordingly, ATM services may make use of these traffic parameters and their corresponding conformance specifications to support different combinations of Quality of Service (QoS) objectives and multiplexing schemes.

Partially overlapping sets of ATM traffic classes have been defined by the Telecommunications Standardization Sector of the International Telecommunications Union (ITU-T) and the ATM Forum. In some instances, traffic classes which have essentially identical attributes have been given different names by these two groups, so the following name translation table identifies the existing equivalent counterparts:

| ITU-T Traffic Class | ATM Forum Traffic Class |
| --- | --- |
| ABR | ABR |
| Deterministic Bit Rate (DBR) | Constant Bit Rate (CBR) |
| Statistical Bit Rate (SBR) | Variable Bit Rate (VBR) |
| (No existing counterpart, but understudy) | Real time Variable Bit Rate (rt-VBR) |
| (No existing counterpart, but understudy) | Unspecified Bit Rate (UBR) |

An ATM service contract for a virtual circuit (VC) connection or a virtual path (VP) connection may include multiple parameters describing the service rate of the connection. This includes the Peak Cell Rate (PCR), the Sustainable Cell Rate (SCR) the Intrinsic Burst Tolerance (IBT), and the Minimum Cell Rate (MCR). Not all of these parameters are relevant for every connection or every service class, but when they are implied or explicitly specified elements of the service contract, they must be respected. VC connections are the primary focus of the following discussion, but it will be understood the VP connections can also be so specified. The data transport unit for an ATM connection usually is referred to as a "cell." In this disclosure, however, the term "packet" is sometimes used to refer to the data transport unit because this more general terminology is consistent with some of the broader aspects of the innovations.

The Generic Cell Rate Algorithm (GCRA), which is specified in ITU-T Recommendation I.371, is well suited for testing a packet or cell flow for conformance with a traffic descriptor. To perform such testing, the GCRA requires the specification of an emission interval (i.e., the reciprocal of a flow rate) and a tolerance, $\tau$. In practice, this tolerance may depend on a variety of factors, including the connection, the connection setup parameters, or the class of service. As will be seen, the GCRA can be employed as a Boolean function, where for a flow of fixed size packets or cells on a connection, the GCRA (emission interval, tolerance) is false if the flow is conforming to a peak rate or true if the flow is conforming to a minimum rate. For example, a source of cells conforms to a PCR if GCRA (1/PCR, $\tau_{PCR}$) is false. Likewise, a connection or flow conforms to an MCR if GCRA (1/MCR, $\tau_{MCR}$) is false. As will be appreciated the "emission interval" is the reciprocal of the "cell rate."

A DBR traffic contract is appropriate for a source which establishes a connection in the expectation that a static amount of bandwidth will be continuously available to the connection throughout its lifetime. Thus, the bandwidth the network commits to a DBR connection is characterized by a PCR value. Further, the cell or packet flow on such a connection complies with the traffic contract if it conforms to GCRA (1/PCR, $\tau_{PCR}$) On the other hand, an SBR traffic contract is suitable for an application which has known traffic characteristics that allow for an informed selection of an SCR and $\tau_{IBT}$, as well as a PCR and $\tau_{PCR}$. An SBR or rt-SBR flow complies with its traffic contract if the flow not only conforms to GCRA (1/PCR, $\tau_{PCR}$), but also to GCRA (1/SCR, $\tau_{IBT}$).

As previously indicated, an ABR traffic contract is appropriate for applications that can tolerate the dynamic variations in the information transfer rate that result from the use of unreserved bandwidth. A PCR and an MCR are specified by the source establishing such a connection, and these parameters may be subject to negotiation with the network. Thus, the bandwidth that is available on an ABR connection is the sum of the MCR (which can be 0) and a variable cell rate that results from a sharing of unreserved bandwidth among ABR connections via a defined allocation policy (i.e., the bandwidth a source receives above its specified MCR depends not only on the negotiated PCR, but also on network policy). Feedback from the network enables the source application to dynamically adjust the rate it feeds cells or packets into an ABR connection. An ABR flow always complies with its traffic contract if it conforms to GCRA (1/MCR, $\tau_{MCR}$), and is always non-compliant if it does not conform to GCRA (1/PCR, $\tau_{PCR}$). Conformance in the region between MCR and PCR is dependent on the ABR feedback and is thus dynamically determined.

A UBR traffic contract is similar to the ABR contract, except that the UBR contract does not accommodate the specification of an MCR and has no dynamic conformance definition. Therefore, a UBR flow complies with its traffic contract if it conforms to GCRA (1/PCR, $\tau_{PCR}$).

B. Traffic Shaping

ITU-T Recommendation I.371 addresses the possibility of reshaping traffic at a network element for the purpose of bringing the traffic into conformance with a traffic descriptor in the following terms:

"Traffic shaping is a mechanism that alters the traffic characteristics of a stream of cells on a VCC or a VPC to achieve a desired modification of those traffic characteristics, in order to achieve better network efficiency whilst meeting the QoS objectives or to ensure conformance at a subsequent interface. Traffic shaping must maintain cell sequence integrity on an ATM connection. Shaping modifies traffic characteristics of a cell flow with the consequence of increasing the mean cell transfer delay.

Examples of traffic shaping are peak cell rate reduction, burst length limiting, reduction of CDV by suitably spacing cells in time and queue service schemes.

It is a network operator's choice to determine whether and where traffic shaping is performed. As an example, a network operator may choose to perform traffic shaping in conjunction with suitable UPC/NPC functions.

It is an operator's option to perform traffic shaping on separate or aggregate cell flows.

As a consequence, any ATM connection may be subject to traffic shaping.

The options available to the network operator/service provider are the following:

a. No shaping
   Dimension the network in order to accommodate any flow of conforming cells at the network ingress whilst ensuring conformance at the network egress without any shaping function.
b. Shaping
   Dimension and operate the network so that any flow of conforming cells at the ingress is conveyed by the network or network segment whilst meeting QoS objectives and apply output shaping the traffic in order to meet conformance tests at the egress.
   Shape the traffic at the ingress of the network or network segment and allocate resources according to the traffic characteristics achieved by shaping, whilst meeting QoS objectives and subsequent conformance tests at the network or network segment egress.

Traffic shaping may also be used within the customer equipment or at the source in order to ensure that the cells generated by the source or at the UNI are conforming to the negotiated traffic contract relevant to the ATC that is used (see Section 5.5)." ITU-T Recommendation I371, Section 6.2.5.

C. Scheduling for Real Time and Non-Real Time Connections/Existing Tools and Techniques As is known, if bandwidth is not divided "fairly" between applications employing "best efforts" Internet service or ABR ATM service a variety of undesirable phenomena may occur. See Lefelhocz, Lyles, Shenker and Zhang, "Congestion Control for Best-Effort Service: Why we need a new paradigm," *IEEE Network*, January/February 1996, for further details on mechanisms for best effort/ABR traffic.

Most ATM switches currently are implemented with FIFO queuing. FIFO queuing exhibits pathological behaviors when used for ABR traffic (see "On Traffic Phase Effects in Packet-Switched Gateways", Sally Floyd and Van Jacobson, *Internetworking: Research and Experience*, Vol. 3, pp. 115–156 (1992), and "Observations on the Dynamics of a Congestion Control Algorithm: The effects of Two-Way Traffic", Lixia Zhang, Scott Shenker, and David Clark, *ACM Sigcomm 91 Conference*, Sep. 3–6, 1991, Zurich, Switzerland, pp. 133–148.). FIFO also is unable to protect correctly behaving users against misbehaving users (it does not provide isolation). As a result of these deficiencies non-FIFO queuing mechanisms such as weighted fair queuing (see, for example, A. Demers, S. Keshave, and S. Shenker, "Analysis and Simulation of a Fair Queuing Algorithm," *Proceedings of ACM SigComm*, pages 1–12, September 1989; and A. K. Parekh "A Generalized Processor Sharing Approach to Flow Control in Integrated Service Networks," Ph.D. Thesis, Department of Electrical Engineering and Computer Science, MIT, 1992.) or approximations to fair queuing such as round-robin (Ellen L. Hahne, "Round-robin Scheduling for Max-Min Fairness in Data Networks," *IEEE Journal on Selected Areas in Communications*, Vol. 9, pp. 1024–1039, September 1991.) are often suggested.

Service classes which have inelastic bandwidth requirements often require that data be transmitted through the network with bounded jitter (i.e., bounded cell or packet delay variation). As shown by the above referenced Parekh paper, weighted fair queuing can be used to provide bounded jitter for real time streams. Moreover, Parekh's results have recently (Pawan Goyal, Simon S. Lam and Harrick M. Vin, "Determining End-to-End Delay Bounds in Heterogeneous Networks," *Proceedings of The 5th International Workshop on Network and Operating System Support for Digital Audio and Video* (NOSSDAV), Durham, N.H., Apr. 18–22, 1995.) been extended to prove delay bounds for systems using the closely related mechanisms of Virtual Clock (Lixia Zhang, "Virtual Clock: A New Traffic Control Algorithm for Packet Switching Networks," *Proceedings of ACM SigComm*, pages 19–29, August 1990.) and Self-clocked Fair Queuing (S. J. Golestani, "A Self-Clocked Fair Queuing Scheme for High Speed Applications," *Proceedings of INFOCOM*, pp. 636–646, 1994).

Thus, it is known that both elastic (Best effort/ABR) and inelastic (or real-time) services can benefit from the use of fair queuing and related algorithms.

1. Weighted Fair Queuing and Virtual Clock

Fair queuing and related algorithms (e.g., frame-based fair queuing, deficit round robin, etc.) operate on sequences of packets or other data transport units (e.g., an ATM cell is a packet). For ATM these sequences are identified by either the VCI or the VPI, while in the Internet protocol suite the identification is on the basis of <IP address, protocol, port> triples (IPv4) or flow identifiers (IPv6). In both self-clocked weighted fair queuing and virtual clock, packets are ordered (sorted) by timestamps (schemes such as round-robin provide approximations to ordering of packets by timestamps). These timestamps represent the virtual finishing time (or equivalently the virtual starting time for the packet and are computed by taking a starting time value and adding an offset obtained by multiplying the length of the packet by a weight which represents the particular packet sequence's share of the bandwidth.

More particularly, for virtual clock the virtual finishing time is computed as:

$$VT(f,0)=0$$

$$VT(f,j+1)=\max\{Arrival(f,j+1), VT(f,j)\}+Length(f,j+1)/Rate(f) \quad (1)$$

where: $VT(f, j)$ is the virtual finishing time associated with packet j of flow (virtual circuit) f;

$Arrival(f, j)$ is the arrival time of packet j of flow f; and $Length(f, j)$ is the length of packet j of flow f.

Self-clocked weighted fair queuing assigns virtual finishing times according to the formula:

$$VT(f,0)=0$$

$$VT(f,j+1)=\max\{SystemVirtualTime,VT(f,j)\}+Length(f,j+1)*weight(f) \quad (2)$$

where: SystemVirtualTime is the virtual time associated with the packet being served (being output) at the time packet(f, j+1) arrives.

For ATM the packet length is constant because the cells are of fixed size (i.e., 53 bytes long). Consequently, rightmost term in both Expression (1) and Expression (2) becomes a per flow constant. For virtual clock the simplified expression is:

$$VT(f,j+1)=\max\{Arrival(f,j+1),VT(f,j)\}+constant(f) \quad (3)$$

For self-clocked weighted fair queuing, on the other hand, the simplified expression is:

$$VT(f,j+1)=\max\{SystemVirtualTime,VT(f,j)\}+constant(f) \quad (4)$$

In other words, an ATM queuing point which implements either virtual clock or self-clocked weighted fair queuing performs the following steps:

1) compute the maximum of (a) the current virtual time for the VC, and (b) either of i) the arrival time of the cell or ii) the system virtual time.
2) add to the results of step 1 above a per-VC constant representing that VC's share of the bandwidth.
3) service cells (transmit them) in order of increasing values of the virtual time stamps assigned by steps 1 and 2.

2. Priority

Giving priority to one traffic class over another means that if the higher priority traffic class has cells ready for transmission, those cells are always transmitted in preference to the cells of the lower priority traffic class.

Priority mechanisms can be either preemptive or non-preemptive. This terminology comes from the operating system literature. A non-preemptive priority mechanism assigns a priority to an object (a process in the operating system world, a VC in the ATM world) at a scheduling time, and the object then retains this priority until it is served. Preemptive priority mechanisms, on the other hand, can change the priority of objects while they are waiting to be served. For example, in a preemptive system one could say "schedule this VC with priority 3 but if it is not served within 200 microseconds then increase its priority up to 2."

3. Work Conserving and Non-work Conserving Queuing

Kleinrock, *Queuing Systems, Vol. 2: Computer Applications*, John Wiley & Sons, N.Y., N.Y. 1996, p. 113 uses the terminology "work conserving" to denote any queuing system in which work is neither created nor destroyed. In keeping with this terminology a switch which, when given queued cells, always transmits cells on the outgoing link is a "work conserving switch". Switches employing a pure FIFO, weighted fair queuing or virtual clock scheduling algorithm are all work conserving. In contrast, a non-work conserving switch may choose not to send cells, even when cells are queued for transmission. As will be seen, a method of doing this is to program the switch to wait until the current time is equal to or greater than the timestamp associated with a particular cell before transmitting that cell.

Work conserving switches attempt to fully utilize the transmission link, but do not necessarily remove or prevent bursts. In contrast, non-work conserving switches can strategically delay cells so as to re-shape traffic to meet a more stringent conformance test (i.e., a GCRA with a smaller τ). Additionally, a non-work conserving switch in which a given connection is only allocated a specified amount of buffering can perform a policing function (in ITU terms a UPC/NPC) by discarding or tagging cells which overflow the allotted buffer space. An example of a non-work conserving queuing system is the Stalled Virtual Clock (Sugih Jamin, "Stalled Virtual Clock" working note, Department of Computer Science, UCLA, Mar. 21, 1994), which is an adaptation of Lixia Zhang's Virtual Clock algorithm where virtual time is not allowed to run faster (it stalls or goes non-work conserving) than real-time. Also see, work by Scott Shenker that is available by FTP at FTP.PARC.XEROX.com.

4. Calendar Queues

A calendar queue is a time ordered list of actions, each of which is dequeued and executed when real-time is equal to or greater than the time associated with the action. Calendar queues with bounded time intervals can be represented as a linear array which is known as a "time-wheel" or "time-line." Time-wheels assign events to buckets relative to a pointer, where the bucket index is calculated using arithmetic modulo the wheel size. These data structures are well known in the literature as a queuing mechanism. In a time-wheel, absolute time is represented as an offset relative to the current time ("real time"), and each element in the array is a bucket which contains one or more actions (typically in linked-list form) which are to be executed at the time assigned to the bucket in which they reside. Any of the buckets of such a time-wheel can be empty, i.e., have no events associated with it.

For every time-wheel, there are two times of interest: $t_{earliest}$ and $t_{latest}$, which correspond to the head and tail pointers for the active entries in the array; where $t_{earliest}$ is the time of the next entry (e.g., packet or cell) to be serviced, and $t_{latest}$ is the time associated with the latest (most distant in time) bucket containing a scheduled event. The difference between $t_{earliest}$ and $t_{latest}$ cannot be greater than the length of the time-wheel, b, minus 1. This can be ensured by viewing the time as being kept modulo b, and by then ensuring that no offset (the packet length multiplied by either the rate or the weight in virtual clock or weighted fair queuing respectively) is greater than b−1. For an ATM link running at OC-3 speeds (149.76 mbps—the SONET payload rate) there are approximately 353208 cells/sec on the link. Accordingly, if 64 Kbps (voice telephony rates) flows (approximately 174 cells/sec when AAL type 1 is used) are the lowest speed connections that need to be supported, then the ratio of the highest supported rate to the lowest rate is 2029, which rounds up to $2^{11}$. This ratio is the maximum offset that will get added during the calculation of virtual times. Therefore, a time-wheel of length 2030 (2048 to allow for rounding up to a power of two) is sufficient to encode the virtual times associated with circuits ranging in rates from 64 Kbps to full OC-3 link rate.

The length of a time-wheel array can be decreased by permitting an array element to contain more than one time offset. For example, if the above-described time-wheel is reduced to 256 elements from 2048, then each bucket would have eight time offsets mapped into it. Actions within a single bucket that spans multiple offsets may be performed out of order, but between buckets actions will stay in order. This reduces the amount of memory that needs to be allocated to such a time-wheel at the cost of reducing the precision of the ordering of actions in the calendar queue.

D. Traffic Shaping for Time Multiplexed Flows on Multiple Output Channels

Preferably, any traffic shaping that is needed to bring time multiplexed packet or cell flows into conformance with their traffic contracts is performed after the completion of all switching or routing operations that are required to separate flows for different output channels from each other. This permits the throughput efficiency of the multiplexer to be optimized.

However, prior output queued ATM switches generally have employed FIFO (First In—First Out) output buffers. These buffers are not capable of participating in a controlled reshaping of any of the flows that pass through them. Instead, the per-VC time multiplexed flows that are output by these buffers essentially are time multiplexed composites of the input flows that are loaded into them. Of course, these output flows are time delayed relative to the input flows because of the inherent latency of the buffers. Moreover, the cell delay variation (CDV) of one or more of these output flows may be increased if scheduling conflicts occur among the data transport limits of the different flows because these conflicts cause so-called "transmit collisions."

As will be appreciated, increased CDV is especially troublesome for traffic, such as DBR traffic, which generally has a relatively tight tolerance. Thus, if each hop between a source and a destination includes a simple FIFO output queue of the foregoing type, it may be necessary to limit the number of hops this CDV sensitive traffic is permitted to make in order to ensure compliance within its specified tolerance.

Accordingly, there is a need for more efficient and more effective traffic shaping mechanisms and processes for ATM switches and other routers that route traffic from multiple inputs to multiple outputs for time multiplexed output emission.

IV. SUMMARY OF THE INVENTION

This invention provides multiple rate sensitive priority queues for reducing relative data transport unit delay variations in time multiplexed outputs from output queued routing mechanisms.

V. BRIEF DESCRIPTION OF THE DRAWINGS

Figure 2:
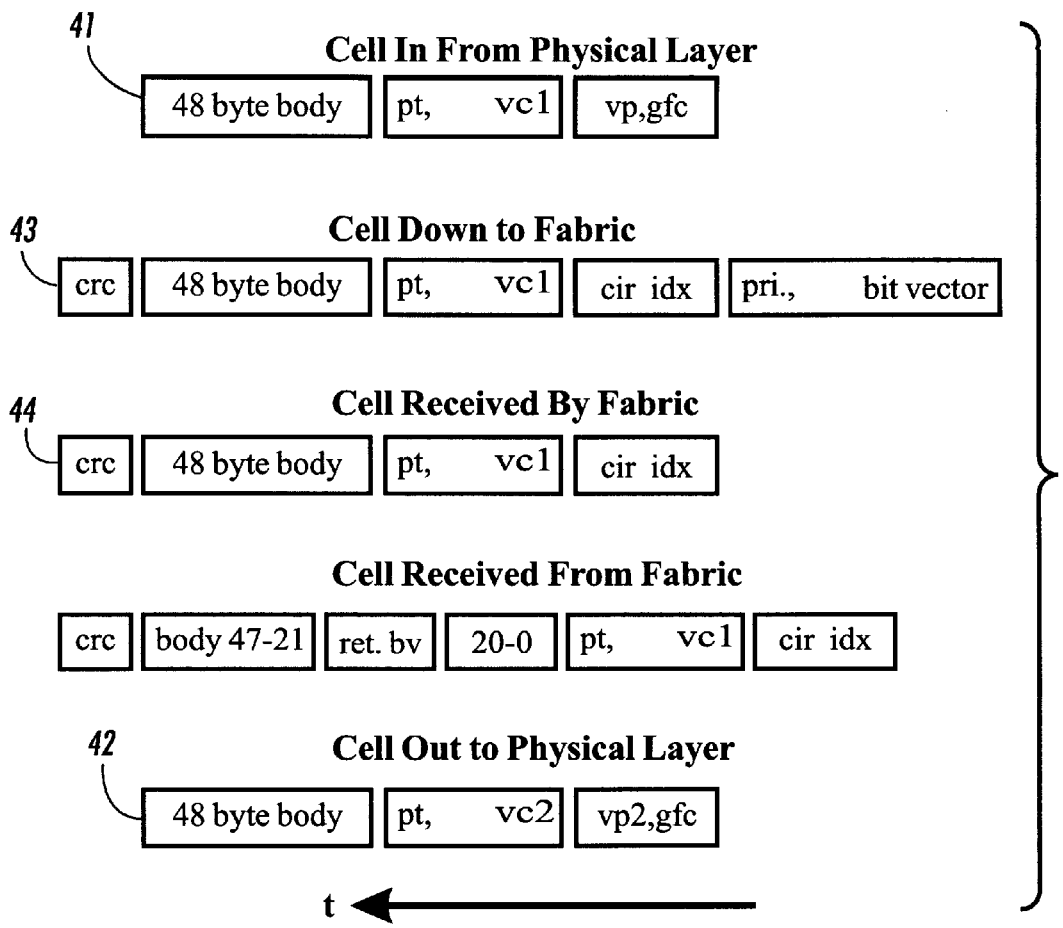
Figure 3:
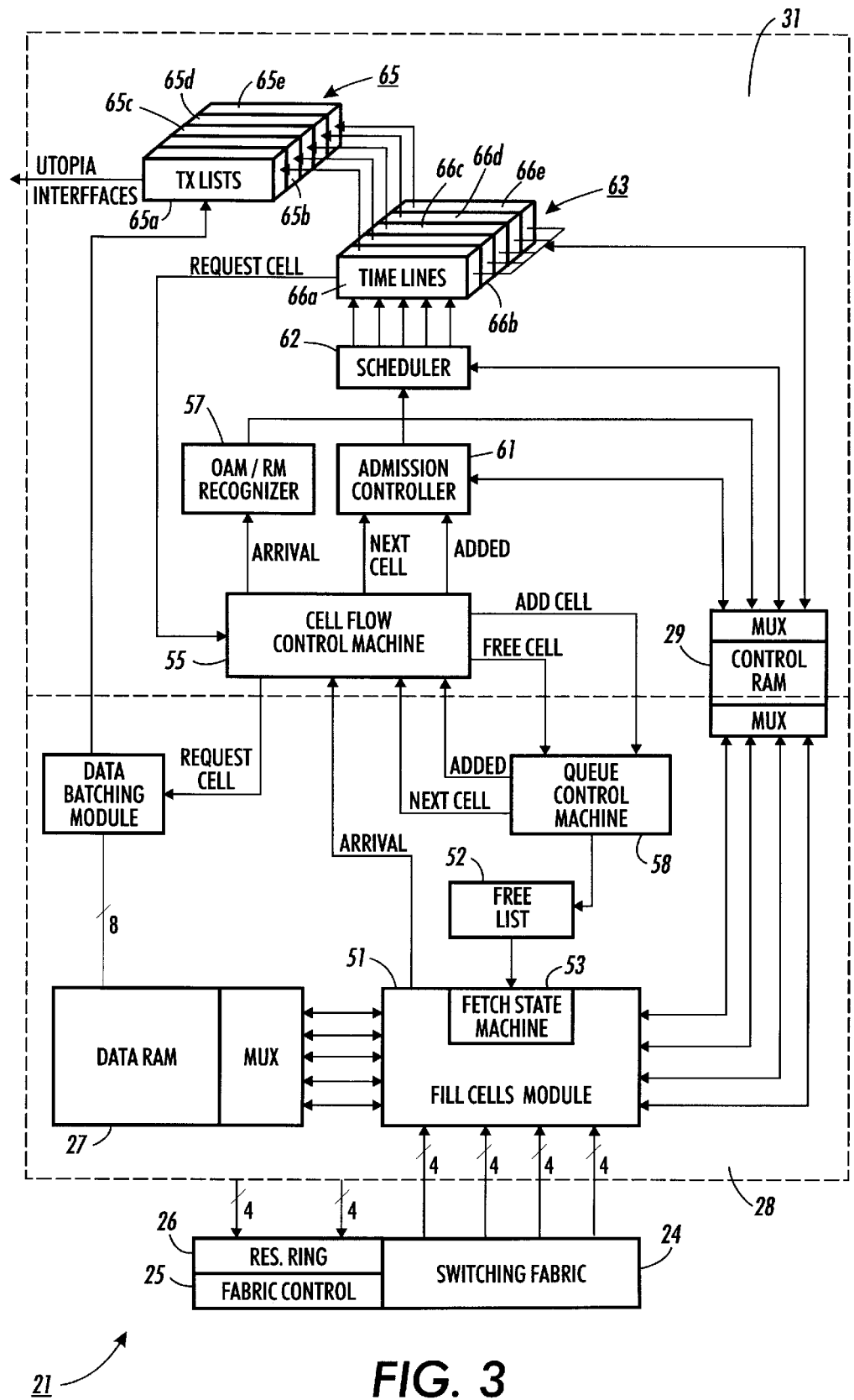

Still further objects and advantages of this invention will be evident when the following details and description is read in conjunction with the attached drawings, in which:

FIG. 1 is a simplified block diagram of an ATM switch in which the present invention may be used to advantage;

FIG. 2 diagrammatically tracks the various shapes an ATM cell may suitably take while traversing the switch shown in FIG. 1; and FIG. 3 is a more detailed block diagram of a representative channel on the output or transmit side of the chip shown in FIG. 1

VI. DETAILED DESCRIPTION OF THE INVENTION

While the invention is described in some detail hereinbelow with specific reference to certain embodiments, it is to be understood that there is no intent to limit it to those embodiments. On the contrary, the intent is to cover all modifications, alternatives and equivalents falling within the spirit and scope of the invention as defined by the appended claims.

A. A Representative Environment

Turning now to the drawings, and at this point especially to FIG. 1, the input and output ports of an ATM switch 21 typically are coupled to one or more physical layers via respective Utopia 2 interfaces and to a switch control processor module 22 via a second suitable interface. This enables the switch 21 to exchange data and control cells with any physical layers that are connected to them, and to also exchange control cells with the control processor module 22. In keeping with standard practices, the communication channels are unidirectional, so a pair of channels are required for bi-directional communications.

The switch 21 comprises a switching fabric 24, a fabric control module 25 and a reservation ring 26 for switching data and control cells from input queues to per-VC output queues. The cells in these queues are stored in the data path in data memory 27, and these input and output queues are managed by a queue control module 28. Typically, the data memory 27 is sized to hold up to roughly 12000 cells. Connection records for the data and control cell flows are stored in the control path in control memory 29, together with certain types of control cells which are intercepted by a rate based engine and traffic multiplexer 31 for routing to the control processor module 22. Suitably, the control RAM 29 is capable of accommodating up to about 8200 connection records and 64 k cell records. The interaction of the control processor module 22 with the switch 21 is beyond the scope of the present invention and, therefore, is not described herein. However, persons who are familiar with ATM switch design will understand that the control processor is primarily responsible for performing connection establishment and termination, as well as OAM (Operation and Maintenance) functions.

The data path of the switch 21 is synchronously clocked (by means not shown) at a predetermined rate of, say, 40 MHz. However, in keeping with conventional synchronous pipeline design practices, the phase of this clock signal is delayed (by means also not shown) by differing amounts at different points along the data path to give the data adequate time to settle prior to being transferred from one pipelined stage to the next.

In accordance with standard practices, a source wishing to communicate with a destination initiates negotiations with the ATM network within which the switch 21 resides by sending a SETUP message to the network. This message identifies the destination and explicitly or impliedly specifies all of the relevant traffic parameters for the requested connection. If the network is prepared to commit to the traffic contract which is defined by these traffic parameters (or a modified version of the parameters that the source is willing to accept), the network routes the SETUP message to the destination. Then, if the destination is ready to receive message traffic from the source in accordance with the terms of the traffic contract, the destination returns a CONNECT message to the source. This CONNECT message confirms that a connection has been established on a specified virtual circuit (VC) within a specified virtual path (VP) for a cell flow that conforms to the traffic contract. See ITU-T Recommendation 0.2391 and ATM Forum UNI 4.0 Specification. "Permanent" virtual connections can be established by provisioning, without invoking these signaling protocols.

Data cells begin to flow after a connection is established. As shown in FIG. 2, the form of the cells change as they pass through the switch 21 because of the operations the switch performs. Cells may be replicated within the switch 21 for multicasting, but the following discussion will be limited to unicast operations to avoid unnecessary complexity.

As indicated in FIG. 2 at 41, each inbound cell that the switch 21 receives has a header containing a VP index and a VC index. These indices combine to define a unique address for one hop of the connection. A connection may be composed of multiple hops, so the VP and VC indices for the next hoop are written into the header of the cell as it passes through the switch 21 as indicated in FIG. 2 at 42.

The switch 21 employs the VP and VC indices of the inbound cell (FIG. 2 at 41) to compute the address at which the connection record for the associated flow resides within the control RAM 29. Typically, this connection record includes a bit vector for identifying the output port (i.e., the switch-level "destination") at which the flow exits the switch 21, a priority index for identifying the relative priority of the flow on a granular priority scale, and a circuit index ("Circuit Index") which uniquely identifies the flow internally of the switch 21. As shown in FIG. 2 at 43, these connection parameters are written into the cell header. Then, the cell is written into the data RAM memory 27, while a pointer to the cell is linked into an appropriate one of a plurality of FIFO input queues, where the selection of the queue is based on the priority of the related flow.

The relative priorities of the head of queue cells within these input queues are examined during each cell time, and the head of queue cell having the highest priority is selected for arbitration during the next arbitration session. Furthermore, the priority of any lower priority head of queue cell (i.e., any non-selected head of queue cell) is incrementally increased (by means not shown), thereby increasing the probability of that cell being selected for arbitration during the next arbitration session. Therefore, even though the higher priority input queues have greater throughput per unit time than the lower priority queues, the lower priority queues have bounded delay because the priority of their head of queue cells increases as a function of time.

Each arbitration cycle requires one cell time of the switch 21, so the routing information for the cells that are selected for arbitration is fed into the reservation ring 26 one cell time prior to the release into the switching fabric 24 of the pay loads of the cell or cells that win the arbitration. In other words, as shown in FIG. 2 at 44, the cells that are received by the reservation ring 26 and switching fabric 24 are composed of the headers of the cells for the next arbitration cycle (i.e., the "current cells") followed by the bodies or payloads of the cells successfully arbitrated during the previous arbitration cycle (i.e., the "previous cells"). Thus, when the cell bodies reach the fabric 24, the fabric is already configured by the fabric control 25 to route those cells to their respective output port destination. For additional information on the reservation ring 26 and the arbitration it performs, see Cisneros, A., "Large Packet Switch and Contention Resolution Device," *Proceedings of the XIII International Switching Symposium*, 1990, paper 14, Vol. III, pp. 77–83 and Lyles U.S. Pat. No. 5,519,698, which issued May 21, 1996.

In the illustrated embodiment, cells are decomposed into four bit wide nibbles for arbitration and routing. Thereafter (with the exception of "idle cells" that may be provided for testing the switching processes) the cells are reassembled and queued in the data path, the control path, or both (a) for time scheduled transfer to the appropriate output ports of the switch 21 and/or (b) for transfer to the control processor module 22. The time scheduled transfer of cells to the output ports of the switch 21 is central to many of the traffic shaping techniques of the related filings so that subject is discussed in further detail hereinbelow. On the other hand, the decomposition and reassembly of the cells, the testing processes, and the interaction of the control processor 22 with RM (Resource Management) and OAM (Operation and Maintenance) cells are incidental topics which need not be considered in depth.

Referring to FIG. 3, it will be understood that the switch 21 fans out on the output or transmit side of the switching fabric 24. Thus, while one output channel of the switch 21 is shown, it will be understood that this channel is generally representative of the other channels.

As shown, there suitably is a fill cells module 51 for accepting cell bodies and their associated circuit indices from the switching fabric 24. The "effective cell time" on the output side of the switching fabric 24 is determined by the ratio of the nominal cell time to the "k" speed-up factor. Thus, for example, if the nominal cell time is 113 clock cycles/cell, the effective cell time on the output side of the switching fabric 24 is 56.5 cycles/cell if k=2.

When a valid cell is received, the fill cells module 51 typically uses cell structures from a linked and numbered free list 52 of such data structures for writing the cell into the data memory 27. To that end, the fill cell module 51 suitably includes a fetch state machine 53 for fetching cell structures form the top of the free list 52 on demand. This enables the fill cells module 51 to insert the circuit index for the cell and a pointer to the location of the cell in data Fan memory 27 into an "arrival" message that it sends to notify a cell flow control unit 55 of the cell's arrival. The circuit index enables the flow control unit 55 to ascertain the VC or flow to which the cell belongs from the connection record in the control memory 29. This, in turn, enables the cell flow control unit 55 to check the traffic shaping status of the flow. An OAM/RM recognizer 27 advantageously is provided to enable the flow control unit 55 to identify these control cells and to determine whether they are to be queued in the data path, the control path, or both.

The memory pointers for cells of traffic contract compliant flows are queued in per-VC queues in response to "addCell" messages which the cell flow control unit 55 sends to a queue control unit 58. Each addCell message identifies the cell to which it pertains and the circuit index for the associated flow or VC. Moreover, the addCell message also indicates whether the cell is to be queued in the data path, the control path, or both. When the cell has been appropriately queued, the queue control unit 58 returns an "added" message to the cell flow control unit 55 for notifying the flow control unit 55 that the newly queued cell needs to be taken into account during future rate shaping computations on the VC to which it belongs.

Advantageously, the queue control unit 58 monitors the length of the per-VC queues with respect to the depth control limits that are set on the respective queues. This enables the queue control unit 58 to initiate congestion control action on ABR flows when their per-VC queues become excessively long. It also permits the queue control unit 58 to identify flows that are exceeding their traffic contract so that an appropriate policing function (not shown) can be invoked to drop or log cells of such non-compliant flows.

An admission controller 61 monitors the "added" messages that are returned by the queue control unit 58 to cause a scheduler 62 to schedule the head of queue cells for the non-empty per-VC queues on a calendar queue 63 for transmission at scheduled times. Suitably, the scheduler 62 employs a per VC virtual clock to schedule these head of queue cells on the calendar queue 63 in accordance with respective virtual finishing times, VT(f, j+1), that the scheduler 62 computes for them (or, alternatively, "virtual start times"). Please see Section III.C.1 above.

The calendar queue 63 tracks system "real time" or "current time" to prevent any of the scheduled cells from being released for transmission prior to its scheduled time. In other words, the scheduler 62 and the calendar queue 63 implement a stalled virtual clock so that the cells that are scheduled for transmission are released for transmission only when system real time has at least reached their respective scheduled transmission times. As illustrated, connections having cells that have been released for transmission by the calendar queue 63 are linked into a link list of connections that have cells ready for transmission on a transmit list 65.

The calendar queue 63 notifies the flow control unit 55 whenever it releases a cell for transmission on any given connection. The flow control unit 55, in turn, requests the reference to the next cell (i.e., the new head of queue cell), if any, on the per-VC queue for the given connection and notifies the admission controller 61 that it should admit this reference to the scheduler 62 for scheduling. Thus, the admission controller 61 effectively engages in closed loop communications with the calendar queue 63 to ensure that the head of queue cells which it admits for scheduling thereon are admitted to the exclusion of all other cells in the per-VC queues. Thus, the calendar queue 63 may be implemented by employing one or more time bounded time-wheels or "time lines," 66. Please see Section III.C.4 above. The time span of these time-wheels must be at least as long as the period of the lowest frequency flows that the system is designed to support to prevent time wrap induced ambiguities and preferably is twice as long so relative times can be compared using two's complement computations.

B. Shaping Flows of Fixed Bit Length Data Transport Limits to Specified Peak Flow Rates Referring to FIG. 3, it will be evident that stalled virtual clock transmission control is well suited for shaping time multiplexed flows of fixed bit length data transport units, such as ATM cells, from an output queued routing mechanism to specified peak data unit flow rates, such as PCRs for DBR/CBR ATM service. As previously described, the data transport units of the flows that are routed to a given output port are queued, after being routed, in per-flow queues. The data transport units at the heads of these queues then are admitted by an admission controller 61 (to the exclusion of all other transport units) for scheduling on a time line calendar queue 63 by a scheduler 62. The scheduler 62, in turn, performs per-flow virtual clock computations on these head of queue transport units to schedule them for release from the calendar queue 63 in accordance with their respective theoretical finish times, VT(f, j+1), or their respective theoretical start times. Please see Section III.C.4 above.

Real time advantageously is incremented on the time line 66 at a rate that enables the shaped, time multiplexed output traffic to essentially fill the bandwidth of the output link. As will be recalled, the maximum number of resolvable time slots into which the scheduler 62 can map the head of queue members of the respective flows is based on the ratio of the maximum permissible frequency to the minimum permissible frequency of those flows. Thus, the rate at which real time is incremented from bucket-to-bucket is a rationale multiple of the cell rate.

Data transport units residing in time slots which represent times that are earlier than or equal to the current real time of reference for the time line 66 are eligible for transmission and, therefore, are linked into a transport list 65 as previously described. However, those data transport units which reside in time slots that are associated with later time slots of the time line 66 remain in a pending state until system real time advances sufficiently to reach those time slots. To avoid rollover ambiguities, the time line 63 is designed to ensure that all references to earlier scheduled data transport limits are removed from each time slot before any references to later scheduled transport units are inserted therein in anticipation of the next scan.

While the above-described arrangement effectively shapes conforming DBR/CBR ATM flows to the PCRs specified by their traffic contracts, it does not aid in bringing the Cell Delay Variation (CDVs) of those flows into conformity with the $\tau_{PCR}$ parameters of their traffic contracts.

C. Multiple Priority Levels for Minimizing Relative CDV

In accordance with the present invention, data transport units that are delivered to a multiplexing point, such as an output port of an ATM switch, by flows having different frequencies are prioritized so that the data transport units of the higher frequency flows are given transmit priority over any data transport units of lower frequency flows with which they happen to collide. As shown in FIG. 3, this transmit priority can be implemented by steering the data transport units that are admitted for scheduling by a stalled virtual clock scheduling mechanism 63 or the like to one or another of a plurality of priority rank ordered time-lines 66a–66e or output FIFO queues based on the frequencies of the flows to which those respective data transport units belong. For example, for an ATM switch, it may be advisable to implement on the order of five different frequency dependent/class of service dependent output priorities, including (1) a top priority for cells from flows that have negotiated output rates of at least $\frac{1}{16}$ of the full rate of the output link (i.e., its aggregate bandwidth), (2) a second priority for cells form flows having negotiated output rates ranging from $\frac{1}{16}$ to $\frac{1}{256}$ of the output link rate, and (3) a third priority for cells from flows having negotiated output rates ranging from $\frac{1}{256}$ to $\frac{1}{4096}$ of the link rate. The lower two priorities then suitably are established for ABR connections that have non-zero negotiated MCR rates and for UBR connections and ABR connections that have MCR rates of 0, respectively.

As will be appreciated the present invention effectively reduces the CDVs of the higher frequency flows, without materially increasing the CDVs of the lower frequency flows. As a general rule, the CDV that is tolerable is a function of the negotiated rate for a flow. For example, a CDV of 100 cell times is very large with respect to an expected emission interval of one cell every 10 cells, but generally insignificant if the negotiated emission interval is only one cell every 2029 cells.

When a calendar queue mechanism is employed to schedule the data transport units or cells of the different frequency flows for transmission, the high frequency high priority flows need to be resolved to the precision of a single cell time while being scheduled to achieve an acceptably low CDV, but the low frequency/low priority flows can be more coarsely resolved to a precision of, say, 16 cell times. This means that the number of time slots on the calendar queue 63 can be reduced. This enables the amount of memory that is required to implement the calendar queue 63 to be reduced at the cost of losing some typically unneeded precision in the scheduling of the head of queue cells of the lower frequency flows.

It is to be understood that the frequency based prioritization technique which the present invention provide for resolving transmission conflicts at multiplex points among flows of different nominally fixed frequencies may be employed in many different applications for reducing the relative jitter of the flows, including in applications having work conserving per-flow output queues for feeding cells or other data transport units into such a multiplex point.

What is claimed:

1. In a packet switched communication system, an apparatus for granting packets of multiple constant bit rate flows time multiplexed, serial access during successive time slots to a shared resource of said system in substantial compliance with individual network traffic contracts for the respective flows, said apparatus comprising:

a queuing mechanism organizing pending packets of active flows in respective queues, with said queues having an oldest pending packet at head of queue order;

a scheduling mechanism coupled to said queuing mechanism, said scheduling mechanism scheduling the oldest pending packets of the respective flows for service at times which are selected in accordance with the respective network traffic contracts for such flows, said scheduling mechanism including a relatively high priority calendar queue and a relatively low priority calendar cueue and said scheduling mechanism preferentially resolving any scheduling conflicts between packets of flows having relatively high and relatively low contractually specified packet emission rates, respectively, in favor of servicing packets of said high emission rate flows first, thereby enforcing a serialized service schedule on the packets of said active flows, while preferentially distributing delay caused by such conflict resolution to the lower emission rate flows; and a transmit mechanism coupled to said queuing mechanism and to said scheduling mechanism, said transmit mechanism transferring packets of said active flows to said shared resource in accordance with said serialized service schedule, said packets being logically transformed for subsequent operation of said traffic shaper from a pending state to a serviced state upon being transferred to said shared resource.

2. The apparatus of claim 1, wherein said scheduling mechanism further resolves scheduling conflicts by scheduling packets of said high emission rate flows on said relatively high priority calendar aueue and scheduling packets of said low emission rate flows on said relatively low priority calendar queue, whereby said scheduling conflicts are resolved by deferring to said relatively high priority calendar queue.

3. In a packet switched communication system, a traffic shaper for granting packets of multiple flows time multiplexed, serial access during successive time slots to a shared resource of said system in substantial compliance with individual network traffic contracts for the respective flows; said traffic contracts establishing respective nominal rates and associated tolerances of specified strictness for said flows; said traffic shaper comprising a queuing mechanism for organizing pending packets of active flows in respective queues, with each of said queues having an oldest pending packet at head of queue order;

a scheduling mechanism coupled to said queuing mechanism for scheduling the oldest pending packets of the respective flows for service at times which are selected in accordance with the respective network traffic contracts for such flows; said scheduling mechanism including a relatively high priority calendar queue and a relatively low priority calendar queue;

where packets of flows having relatively strict tolerances on their contractually established nominal rates are scheduled on said high priority calendar queue, and packets of flows having relatively loose tolerances on their contractually established nominal rates are scheduled on said low priority calendar queue, whereby any scheduling conflicts are resolved by deferring to said high priority queue to enforce a serialized service schedule on the packets of said active flows, while distributing delay caused by such conflict resolution to flows having relatively loose tolerances;

said high priority calendar queue having a relatively fine resolution to accommodate the scheduling of packets of flows having relatively tight tolerances to a precision which is on the order of a single one of said time slots; and said low priority calendar queue having a coarser resolution to accommodate a less precise scheduling of packets of flows having a relatively loose tolerance a transmit mechanism coupled to said queuing mechanism and to said scheduling mechanism for transferring packets of said active flows to said shared resource in accordance with said serialized service schedule, said packets being logically transformed for subsequent operation of said traffic shaper from a pending state to a serviced state upon being transferred to said shared resource.

4. The packet switched communication system of any of claims 1–3 wherein said scheduling mechanism includes a virtual time stamp mechanism for scheduling said packets for service on said calendar queues.

5. The packet switched communication system of claim 4 wherein said packets have a uniform fixed bit length.

6. The packet switched communication system of claim 5 wherein said packets are fixed constant byte length cells for asynchronous transfer mode communications.

* * * * *

UNITED STATES PATENT AND TRADEMARK OFFICE
CERTIFICATE OF CORRECTION

PATENT NO. : 6,064,677
DATED : May 16, 2000
INVENTOR(S) : Kappler et al.

It is certified that error appears in the above-identified patent and that said Letters Patent is hereby corrected as shown below:

In Column 13, Claim 1, line 36, delete "cueue" and insert --queue-- therefor.

In Column 13, Claim 2, line 57, delete "aueue" and insert --queue-- therefor.

Signed and Sealed this

Twenty-second Day of May, 2001

*Attest:*

NICHOLAS P. GODICI

*Attesting Officer*        *Acting Director of the United States Patent and Trademark Office*